(12) United States Patent
Tagashira

(10) Patent No.: US 8,997,238 B2
(45) Date of Patent: Mar. 31, 2015

(54) MANAGEMENT DEVICE OF HARDWARE RESOURCES

(75) Inventor: Kenji Tagashira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 12/836,085

(22) Filed: Jul. 14, 2010

(65) Prior Publication Data

US 2010/0281196 A1 Nov. 4, 2010

Related U.S. Application Data

(63) Continuation of application No. PCT/JP2008/056055, filed on Mar. 28, 2008.

(51) Int. Cl.
*G06F 7/04* (2006.01)
*G06F 17/30* (2006.01)
*H04N 7/16* (2011.01)
*G06F 21/81* (2013.01)
*G06F 21/10* (2013.01)
*G06F 21/73* (2013.01)
*G06F 21/74* (2013.01)

(52) U.S. Cl.
CPC .................. *G06F 21/81* (2013.01); *G06F 21/10* (2013.01); *G06F 21/73* (2013.01); *G06F 21/74* (2013.01); *G06F 2221/2105* (2013.01); *G06F 2221/2129* (2013.01); *G06F 2221/2141* (2013.01); *G06F 2221/2147* (2013.01)
USPC ............................................. 726/26; 713/153

(58) Field of Classification Search
CPC ......... G06F 21/81; G06F 21/10; G06F 21/74; G06F 2221/2105; G06F 2221/2147
USPC .......................................................... 726/26
See application file for complete search history.

(56) References Cited

U.S. PATENT DOCUMENTS

| 2004/0010581 A1* | 1/2004 | Dodapati et al. | 709/224 |
| 2006/0080523 A1* | 4/2006 | Cepulis | 713/100 |
| 2007/0011311 A1* | 1/2007 | Kawaji et al. | 709/224 |
| 2007/0133793 A1* | 6/2007 | Kimura | 380/54 |
| 2007/0256076 A1* | 11/2007 | Thompson et al. | 718/102 |

FOREIGN PATENT DOCUMENTS

| JP | 9-146898 | 6/1997 |
| JP | 10-171559 | 6/1998 |

(Continued)

OTHER PUBLICATIONS

J. A. Zachman; A framework for information systems architecture; Year: 1987; IBM; vol. 26, No. 3, pp. 276-292.*
English Translation of the International Preliminary Report on Patentability mailed Nov. 18, 2010 in corresponding International Patent Application PCT/JP2008/056055.

(Continued)

*Primary Examiner* — Shewaye Gelagay
*Assistant Examiner* — Monjour Rahim
(74) *Attorney, Agent, or Firm* — Staas & Halsey LLP

(57) ABSTRACT

A management device for managing states of components. The management device includes a reading unit to read management information from each of plural components; a determining unit to refer to license information associated with management information of each component stored in a license storage unit, and to determine, based on the referred license information, whether each component is usable or not; and an operation control unit to make a component determined to be usable operate but to inhibit an operation of a component determined to be unusable.

12 Claims, 16 Drawing Sheets

(56) References Cited

FOREIGN PATENT DOCUMENTS

| | | |
|---|---|---|
| JP | 2004-30633 | 1/2004 |
| JP | 2006-338229 | 12/2006 |
| JP | 2007-18102 | 1/2007 |

OTHER PUBLICATIONS

International Search Report for PCT/JP2008/056055, mailed Jul. 1, 2008.

* cited by examiner

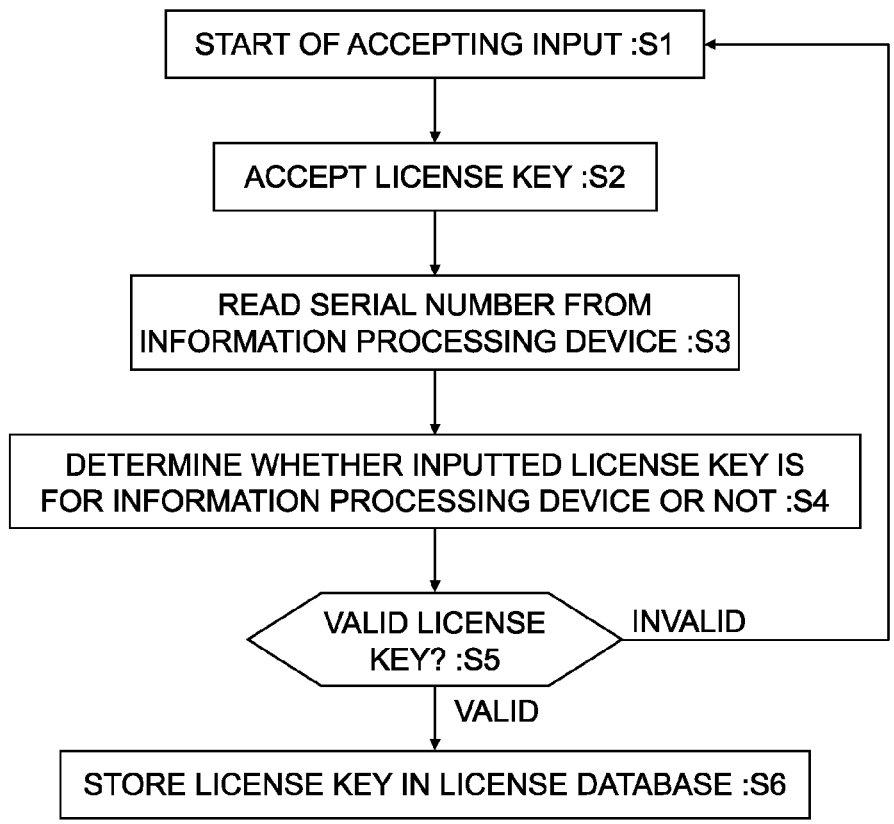

FIG. 17
DATA LOCATIONS IN MEMORY 21 OF CPU
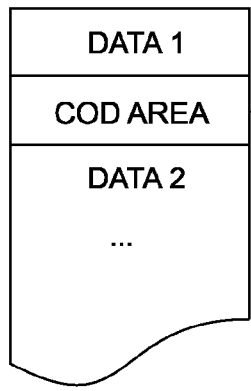
FORMAT INFORMATION 21D (FIRST BYTE)
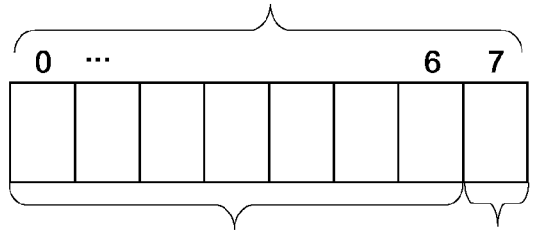
000001 : STORAGE METHOD IN FIRST EMBODIMENT
000000 : STORAGE METHOD IN SECOND EMBODIMENT
ODD PARITY
STATUS INFORMATION 21A (SECOND BYTE)
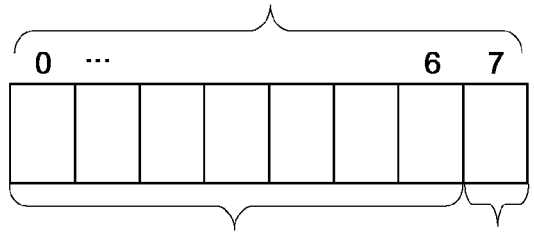
000001 : COD TARGET
000000 : COD NON-TARGET
ODD PARITY
LICENSE DETERMINING INFORMATION 21C (THIRD BYTE)
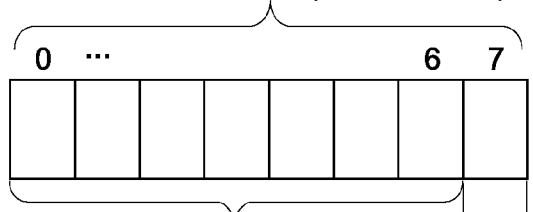
000001 : LICENSE ALREADY ACQUIRED
000000 : LICENSE NOT YET ACQUIRED
ODD PARITY
IDENTIFYING INFORMATION 21B
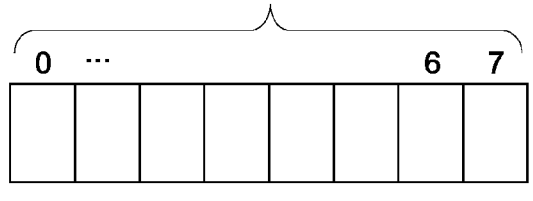

MANAGEMENT DEVICE OF HARDWARE RESOURCES

CROSS-REFERENCE TO RELATED APPLICATIONS

This is a continuation of Application PCT/JP2008/056055, filed on Mar. 28, 2008, now pending, the entire contents of which are herein wholly incorporated by reference.

FIELD

The present invention relates to a technology of controlling how hardware resources are used.

BACKGROUND

At the present, there is an information processing device provided with a function known as Capacity on Demand (which will hereinafter be abbreviated to COD) in which a user utilizes a necessary quantity of hardware resources such as CPUs when a necessity arises.

For example, a method of providing the COD for controlling usage number of the CPUs is that at first, on the occasion of purchasing the information processing device mounted with a plurality of CPUs, a cost corresponding to the number of the CPUs used by a user is paid, and the information processing device is utilized by operating this number of CPUs. Namely, the information processing device is utilized in a status of inhibiting operations of the CPUs over this number of CPUs.

Then, if a throughput of the information processing device is required to be enhanced, the user acquires a license key by newly purchasing the right of using the CPUs and inputs this license key to the information processing device, thereby enabling the use of the CPUs that have not been used so far.

Through this process, the throughput can be quickly enhanced only by the input operation. Further, it may be sufficient that a necessary quantity of usage right is purchased when required, and hence an initial investment of the system can be restrained.

In the conventional information processing device, however, information indicating whether a CPU is a COD target or not is not held by the CPU itself but stored on a system board or stored in the information processing device itself. For example, the information indicating the use or non-use is stored on a per-slot-number basis of a slot for mounting the CPUs, and the use or non-use of the CPUs mounted in each slot is determined based on this information.

Therefore, such a problem arises that the non-use CPU, if demounted and then mounted in another information processing device, can be thus used without purchasing the license.

It should be noted that technologies disclosed in the following Patent documents are given by way of the prior arts related to the invention of the present application.

[Patent Document 1]
Japanese Patent Laid-Open Publication No. 09-146898
[Patent Document 2]
Japanese Patent Laid-Open Publication No. 2006-338229

SUMMARY

According to an aspect of the present invention, a management device includes a reading unit to read management information from each of plural components; a determining unit to refer to license information associated with management information of each component stored in a license storage unit, and to determine, based on the referred license information, whether each component is usable or not; and an operation control unit to make a component determined to be usable operate but to inhibit an operation of a component determined to be unusable.

According to another aspect of the present invention, management method executed by a computer includes reading management information from each of plural components; referring to a license storage unit with respect to one or more pieces of license information associated with the read plural pieces of management information; determining, based on the one or more pieces of license information, whether each component is usable or not; making each component determined to be usable operate; and inhibiting the operation of each component determined to be unusable.

According to still another aspect of the present invention, a non-transitory storage medium is stored with a management program that causes, when read and executed by a computer, the computer to perform reading management information from each of plural components; referring to a license storage unit with respect to one or more pieces of license information associated with the read plural pieces of management information; determining, based on the one or more pieces of license information, whether each component is usable or not; making each component determined to be usable operate; and inhibiting the operation of each component determined to be unusable.

Incidentally, storage medium connotes a recording medium capable of storing information such as data and programs electrically, magnetically, optically, mechanically or by chemical action, which can be read from the computer. Among these storage mediums, for example, a flexible disc, a magneto-optic disc, a CD-ROM, a CD-R/W, a DVD, a DAT, an 8 mm tape, a memory card, etc. are given as examples of those removable from the computer.

Further, a hard disc, a ROM (Read-Only Memory), etc. are given as examples of the storage mediums fixed within the computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is an explanatory flowchart illustrating a process of adding a license key to the information processing device;
FIG. 6 is an explanatory diagram of a license database.

FIG. 17 is a diagram illustrating an example of the data locations in the memory provided in the component in a third embodiment;

DESCRIPTION OF EMBODIMENTS

First Embodiment

Figure 1:
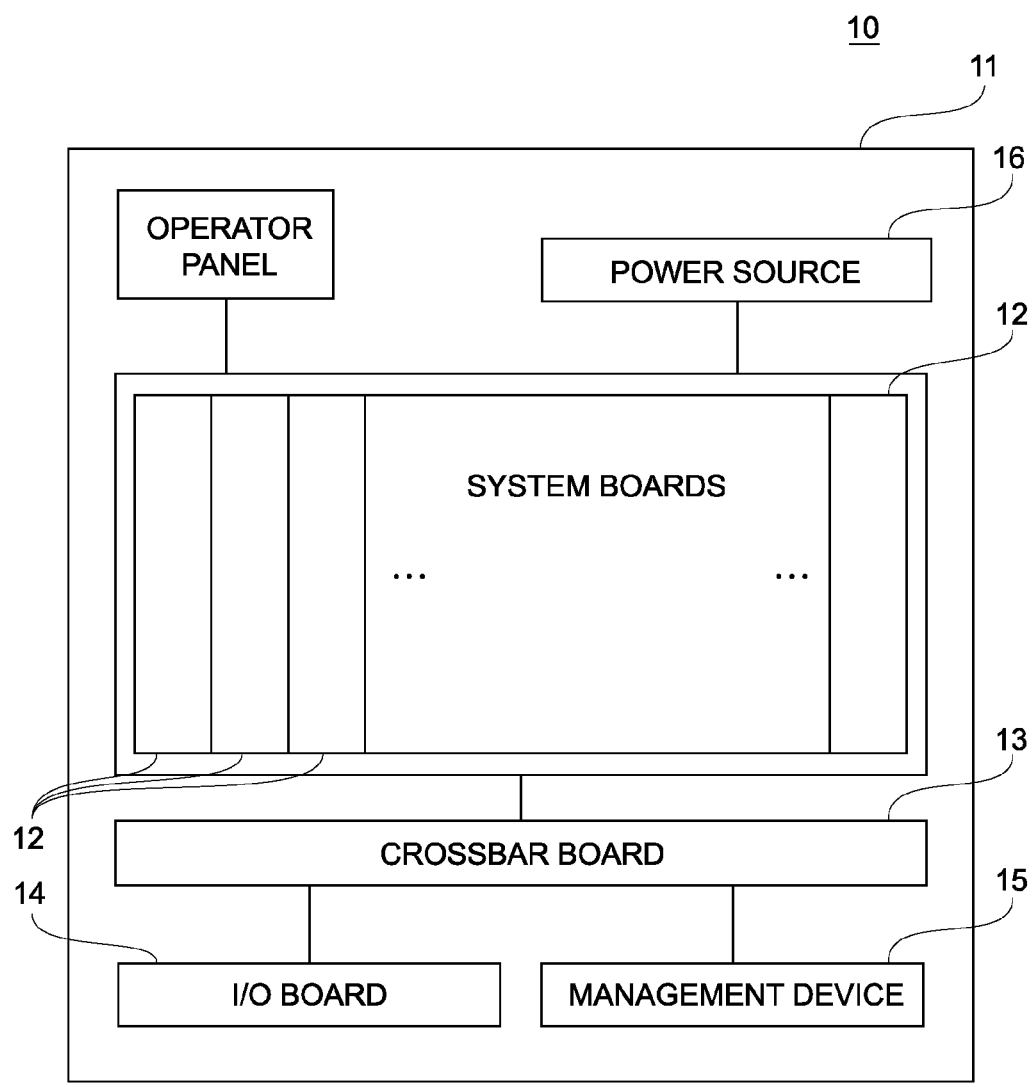
FIG. 1 is a schematic diagram of an information processing device.

FIG. 1 is a schematic diagram of an information processing device in a first embodiment.

An information processing device 10 is a computer including a plurality of system boards 12, a crossbar board 13, an input/output (I/O) board 14, a management device 15, a power source 16, etc., which are accommodated in a housing 11.

Figure 2:
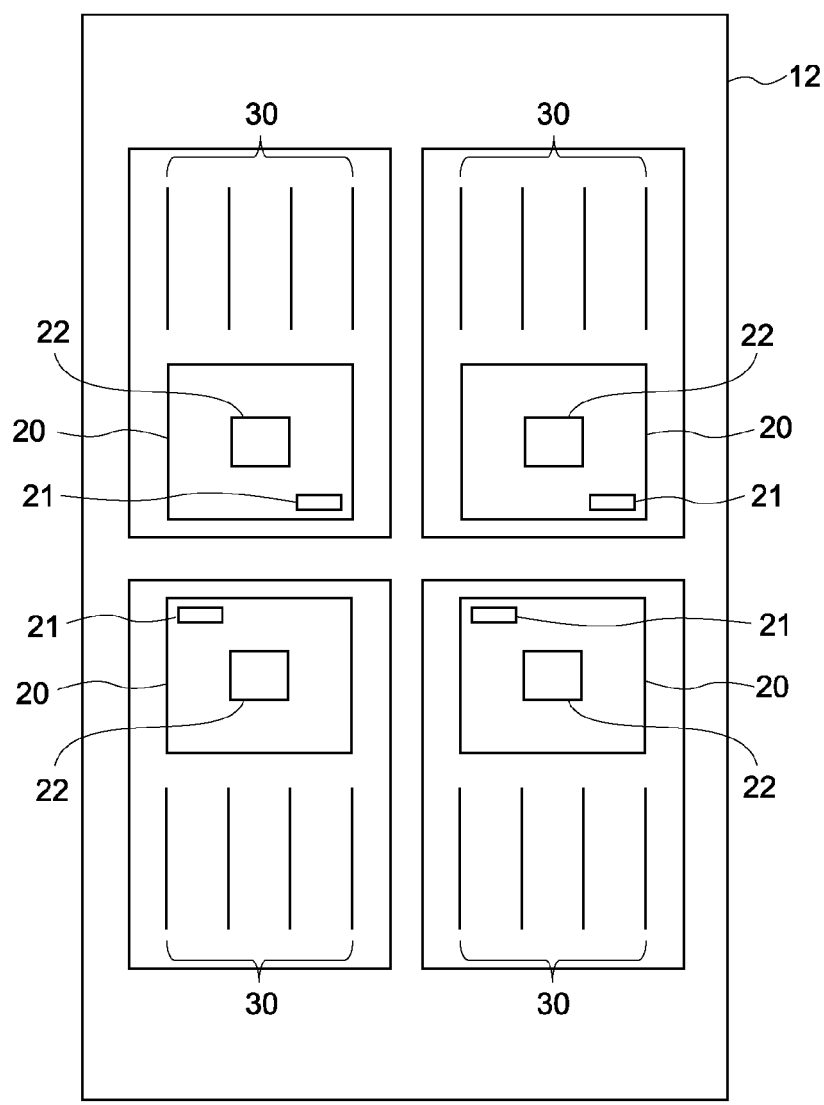
FIG. 2 is a schematic diagram of a system board.

FIG. 2 is a schematic diagram of the system board 12 that is each mounted with a plurality of CPUs (Central Processing Units) 20 and a plurality of memories 30.

In this embodiment, the CPU 20 is a component that can become a COD target component. It may be sufficient that a component that can be a COD target includes an operation unit performing a predetermined operation and a storage unit stored with management information. For example, in the case of the CPU 20, a core 22 conducting an operation such as an arithmetic process corresponds to an example of the operation unit, and a memory (FRU ID ROM) 21 stored with COD information defined as the management information for the COD corresponds to an example of the storage unit.

The information processing device 10 in the embodiment includes eight system boards 12 each mounted with four CPUs 20. Namely, the information processing device 10 mounted with totally 32 CPUs. Further, each CPU may have a plurality of cores.

In the embodiment, among 32 CPUs, 8 CPUs are components that are not a COD target component (referred to as "COD non-target component") and are always usable, while the remaining 24 CPUs are COD target components.

The crossbar board 13 establishes connections between the CPUs 20 and connections between the I/O board 14 and each CPU 20. In the case of carrying out SMP (Symmetric Multi-processing), the crossbar board 13 establishes the connections so that all of the CPUs 20 can access all of the memories 30 and the I/O board 14 equally irrespective of their mounting positions.

The I/O board 14 is equipped with the storage device such as a hard disc and with interfaces with peripheral devices, such as a PCI Express. A network card (an example of a communication control unit) etc. for performing communications with other computers can be connected to the interface. Further, the storage device stores data and software for the arithmetic process.

The power source 16 supplies electric power to the respective units 12-15 within the information processing device when a power button (not illustrated) of an operator panel is pressed. Further, the power source 16 is capable of selectively stopping or starting supply of the electric power to the respective units, corresponding to control signals given from the management device 15.

Figure 3:
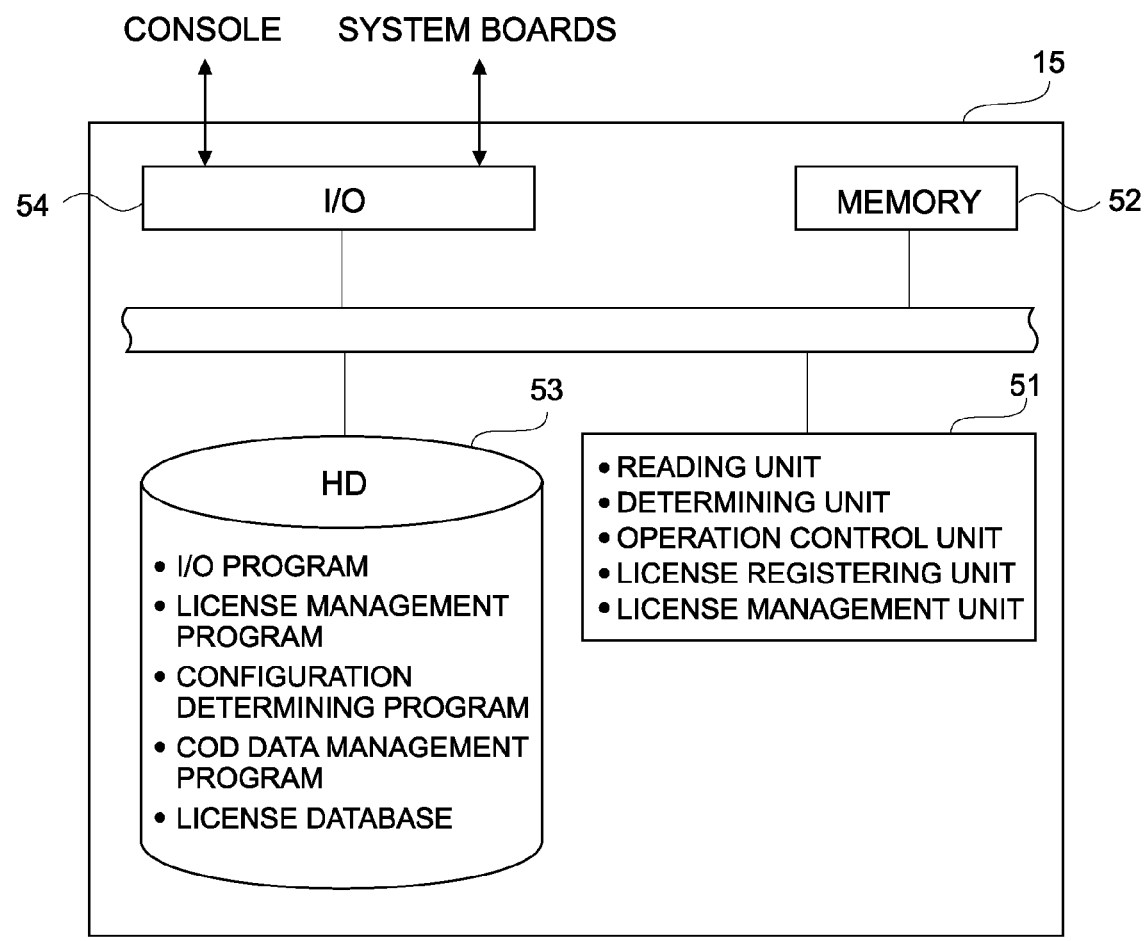
FIG. 3 is a schematic diagram of a management device.

FIG. 3 is a schematic diagram of the management device 15. The management device 15 is a computer including a CPU 51, a memory 52, a storage unit 53 and an input/output unit 54, separately from the CPU 20 of the information processing device 10. The management device performs monitoring and setting of the information processing device 10.

A console having an input unit such as a keyboard and an output unit such as a monitor is connected to the input/output unit 54 directly or via a network. Further, the input/output unit 54 is connected to the system boards etc., which are the management targets.

Firmware corresponding to the management program which is configured by a configuration determining program, a license management program, a COD data management program and an input/output program, is installed in the storage unit 53. Moreover, the storage unit 53 functions as a license database (an example of a license storage unit) that stores license information defined as license-related information representing whether a license to use a COD target component is obtained or not.

The CPU 51 properly reads the firmware from the storage unit 53, then executes the firmware and arithmetically processes the information inputted from the input/output unit 54 and the information read from the storage unit 53. The CPU 51 thereby functioning as a reading unit, a determining unit, an operation control unit, a license registering unit and a license management unit.

In the case of functioning as the reading unit, the CPU 51 reads management information from each of COD-target-enabled components.

In the case of functioning as the determining unit, the CPU 51 determines a COD target component to be usable if the license information associated with the management information of the COD target component is stored in the license storage unit, but determines that the COD target component to be unusable if the license information is not stored therein.

In the case of functioning as the operation control unit, the CPU 51 makes the COD target components determined to be usable operate, but inhibits the operation of the COD target components determined to be unusable. For example, the operation control unit transmits the control signal to the power source 16 to start the power to the COD target components determined to be usable, and to stop supplying the power to the COD target components determined to be unusable, thereby controlling whether each COD target component should be operated or not, in other words, whether an operation of each COD target component should be inhibited or not. Further, the operation control unit may control whether the COD target components should be operated or not by transmitting the control signal to the crossbar board 13 to connect the COD target components determined to be usable to other components, and not to connect the COD target components determined to be unusable to other components. Moreover, without being limited to these schemes, CPU may have a function for controlling the operation of the COD target components based on the control signals thereto.

Furthermore, in addition to the complete inhibition of the operation of the COD target components, "inhibition of the operation of the COD target components" may include restricting some of functions, a capacity, a speed, an operating frequency, etc, of the COD target components. For example, CPU may have a function to restrict configuration number of the SMP, and inhibiting SMP operation by the CPU exceeding a license count, while permitting the individual CPU to operate.

In the case of functioning as the license registering unit, the CPU 51 checks whether or not the license key is a key relevant to the mounted COD target component when a license key is inputted. If the license keys is a relevant key, CPU 51 stores license information indicating that license of the COD target component has already been acquired to the license database.

In the case of functioning as the license management unit, the CPU 51 refers to the license database in response to a query about whether the license exists or not, and sends a result of the reference back to the inquirer.

Figure 4:
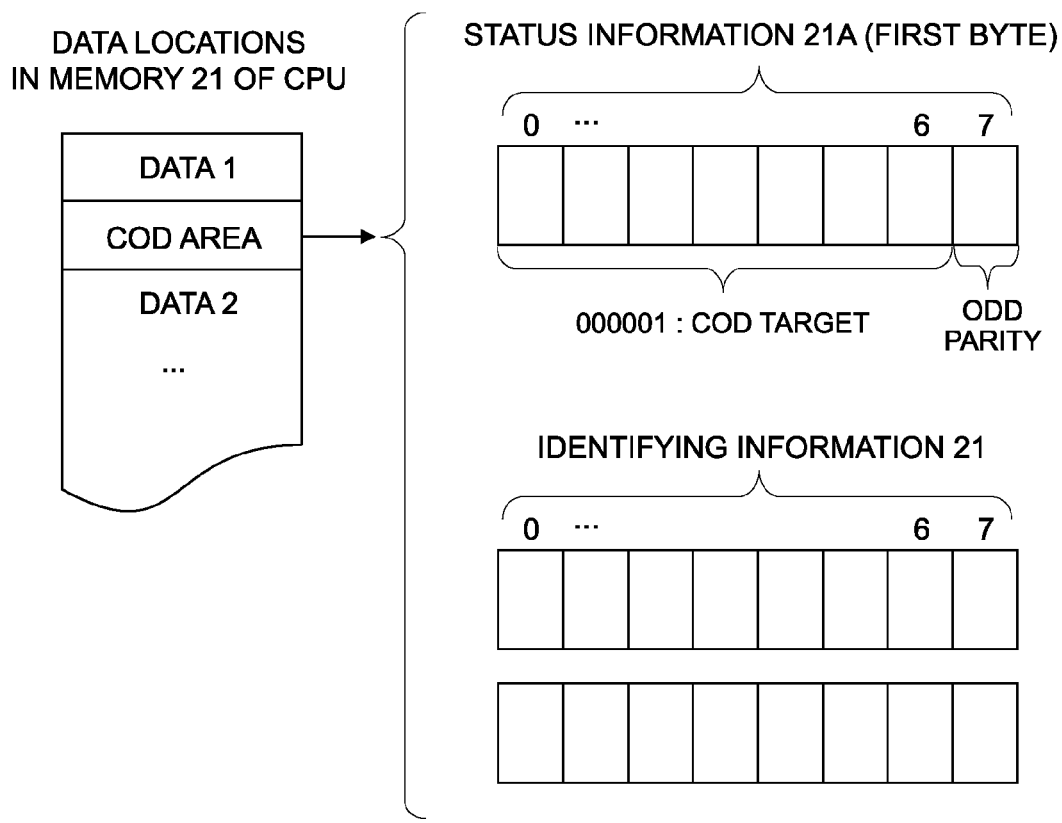
FIG. 4 is a diagram illustrating an example of data locations in a memory provided in a component.

FIG. 4 is a diagram illustrating an example of data locations in the memory 21 provided in the CPU 20 in the first embodiment.

The memory 21 has a COD area in specific addresses, and COD information is stored in the COD area. First byte of the COD information is information representing whether the CPU 20 is a COD target component or not, i.e., status information 21A. In this 1-byte status information, seven bits are used as a code represents whether the CPU 20 is the COD target component or not, and the last 1 bit is used as a parity code for detecting garbled data.

Further, the COD information in the memory 21 contains identifying information 21B unique to each CPU from the second byte onward. In the first embodiment, this identifying information is a serial number of the CPU.

Each of processes of a management method executed by the management device 15 having the configuration described above according to the firmware will be described with reference to FIGS. 5-9.

FIG. 5 is an explanatory flowchart illustrating a process of adding a license key to the information processing device.

When the user who purchased the license key makes a license adding instruction by operating a console connected to the management device, the management device executes an input/output program (S1), and the CPU 51 functions as the license registering unit. At first, the license registering unit prompts the user to input the license key by displaying a message.

When receiving the license key via the console through the user's operation (S2), the license registering unit reads the identifying information (serial number) of the information processing device 10 from the memory (FRU ID ROM) of the housing 11 or the management device 15 (S3).

Then, the license registering unit checks whether the inputted license key is a valid key for the information processing device or not, i.e., whether the inputted license key is relevant to the readout serial number or not (S4), if the inputted license key has not yet been registered.

For example, the license registering unit processes the serial number and the license key with a function such as a hash function, and checks whether a predetermined result is acquired or not. Therefore, the license key is generated so that the predetermined result is acquired when executing the process in combination with the serial number of the information processing device 10 to be registered.

As a result, the license registering unit loops back to s1 for requesting an input of the license key if the license key is invalid (S5, INVALID). If the license key is valid (S5, VALID), the license registering unit stores the license key (license information) in the license database (S6).

FIG. 6 is an explanatory diagram of the license database. In the first embodiment, the license key determined to be valid is stored in the license database. Namely, the number of the license keys (a license count) stored in the license database corresponds to the number of the CPUs usable in the information processing device 10.

Note that the license database may adopt, without being limited to the structure described above, other data structures corresponding to contents to be managed. For example, if the license key is generated according to a license count C, the license registering unit checks whether the license key is a key suitable for the license count C or not, and, if so, registers the license count C and the license key in the way of being associated with each other in the license database. In this case, a total number of the license counts C registered in the license database corresponds to the number of the usable CPUs.

Figure 7:
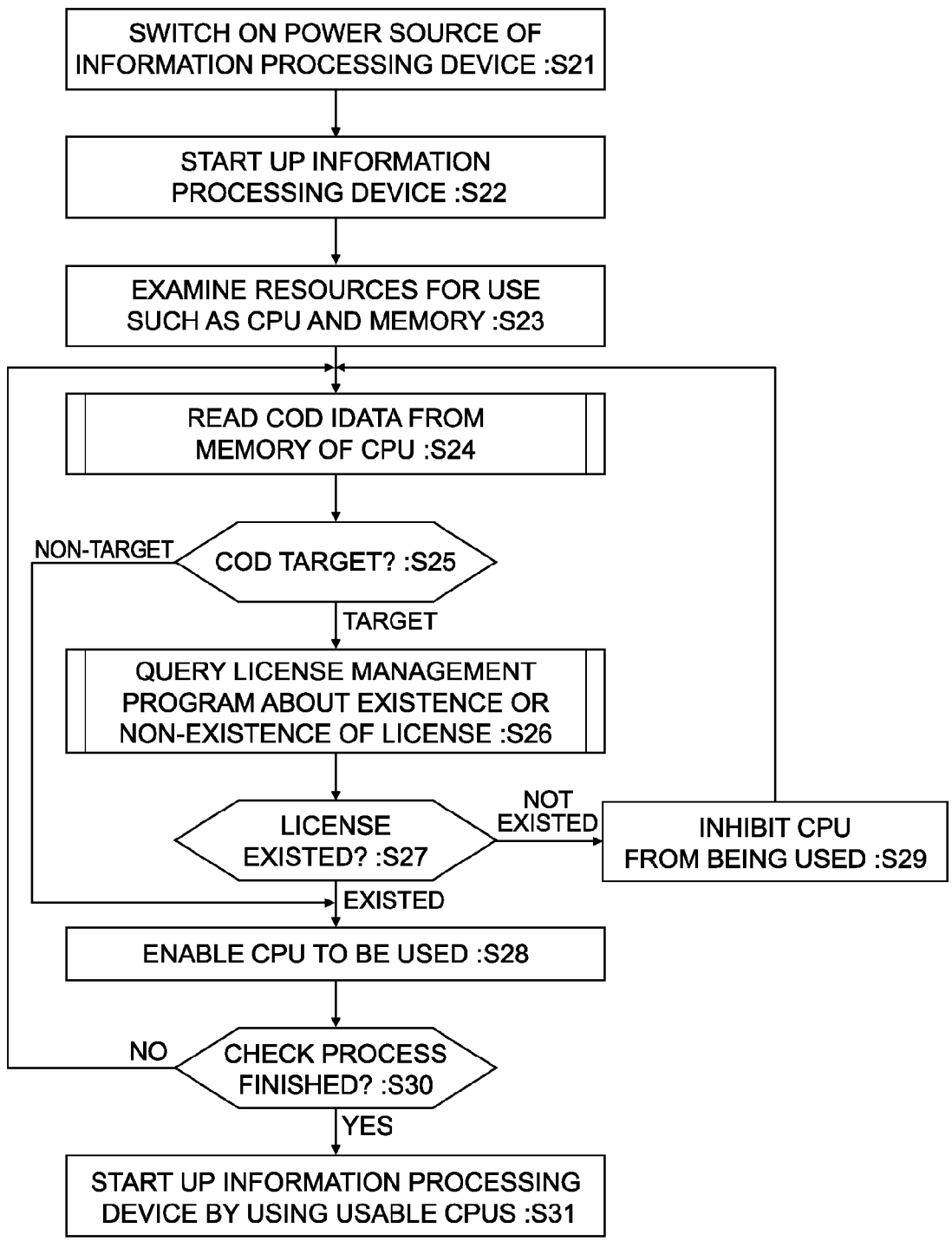
FIG. 7 is an explanatory flowchart illustrating a process executed according to a configuration determining program.

FIG. 7 is an explanatory flowchart of processes executed according to a configuration determining program when starting up the information processing device.

When the user performs an operation of starting up the information processing device, e.g., when a power switch of an operator panel (unillustrated) is switched ON (S21) and the startup of the information processing device takes place (S22), the management device 15 executes the configuration determining program, whereby the determining unit checks hardware resources such as the CPUs 20 and the memories 21, which are mounted in the information processing device 10 (S23).

Then, the determining unit requests the COD data management program (reading unit) to read at least status information in the COD information of a component mounted in the information processing device (S24). The CPU 20 will hereinafter be exemplified as the component for the convenience's sake, however, other component may be available.

Subsequently, the determining unit determines, based on a response from the reading unit, whether the CPU 20 is the COD target component or not (S25).

Further, the determining unit queries the license management program (the license management unit) about whether a license to use the CPU 20 is available or not (S26) if the determining unit determined that the CPU 20 is a COD target component.

If the license management program makes a response indicating that there is the license to use the CPU 20, the configuration determining program determines that the CPU is usable. On the other hand, if the license management program makes a response indicating that there is no license to use the CPU, the configuration determining program determines that the CPU is unusable (S27).

If the CPU 20 is determined to be usable in s27 or if the CPU 20 is determined to be the COD non-target component in s25, the operation control unit conducts the control to enable the CPU 20 to be used (S28). The operation control unit starts supplying power to the CPU 20, allocates the CPU as the hardware resource and connecting the CPU to the I/O unit and to the memories.

Whereas if the CPU 20 is determined to be unusable in s27, the operation control unit conducts the control to inhibit the CPU 20 from being used (S29). The operation control unit inhibits the CPU 20 from being supplied with the power, allocated as the hardware resource and connected to the I/O unit and to the memories.

The COD information check processes (S24-S29) with respect to each of the CPUs 20 mounted in the information processing device are repeated (S30). When the check processes for all of the CPUs are finished, the information processing device is started up by employing the usable CPUs 20 (S31).

Figure 8:
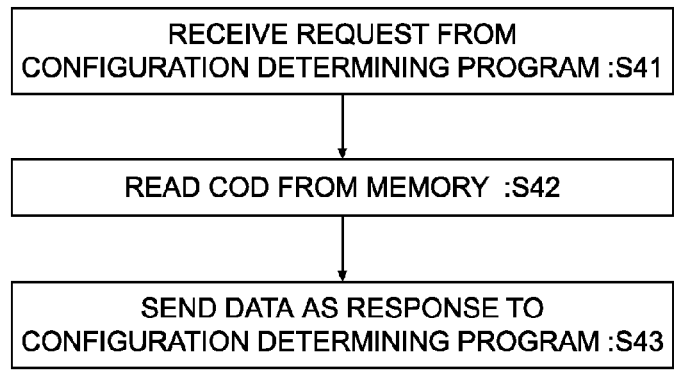
FIG. 8 is an explanatory flowchart illustrating a process of a COD data management program.

FIG. 8 is an explanatory flowchart illustrating the process of the COD data management program when the COD information is requested in s24.

Upon receiving the request for the COD information, the COD data management program is executed (S41), whereby the reading unit reads the COD information from the memory 21 of the CPU 20 (S42) and transmits the data back to the configuration determining program (S43).

Figure 9:
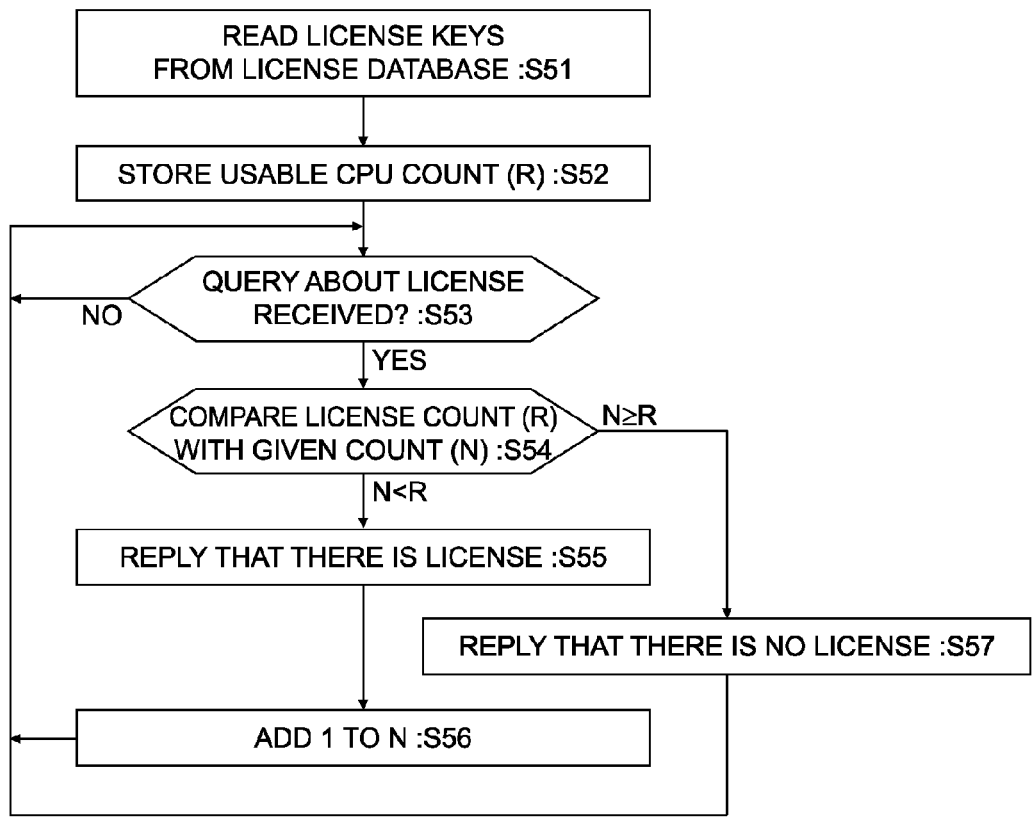
FIG. 9 is an explanatory flowchart of a process executed according to a license management program.

FIG. 9 is an explanatory flowchart illustrating a process executed according to the license management program when receiving a query about the license information from the configuration determining program.

When the management device 15 starts executing the COD data management program, the license management unit reads and counts the license keys from the license database (S51), and this license count is stored as a usable CPU count (R) (S52).

Then, the license management unit waits for the query from the configuration determining program about whether there is the license to use the CPU or not. When receiving this query (S53), the license management unit compares the CPU count (N) of the CPUs given the licenses with the usable CPU count (R)(S54). The CPU count (N) denotes execution count of S55.

If N<R, the license management unit makes a response indicating that there is a license for the license information query target CPU (S55), then increments the CPU count (N) by 1 (S56) and loops back to s53.

While on the other hand, if it is determined that N is larger that or equals to R in s54, the license management unit makes a response indicating that there is no license for the license information query target CPU, and loops back to s53 (S57).

As described above, according to the first embodiment, the management device 15 determines the usability of each component (hardware resource) on the basis of the management data set in each component, and hence the fraudulent use of the hardware resources can be prevented. For example, when a COD non-target CPU 20 fails, it is possible to prevent the fraudulent use of a COD target CPU 20 not under license by replacing the failed CPU 20 with the COD target CPU 20 not under license.

Moreover, if mounting the management devices 15 in all other information processing devices, the determination as to whether each component is the COD target component or not is invariably made, thereby enabling the fraudulent use to be prevented in a way that transfers the CPUs into other information processing devices having different contents of contracts and different setting environments.

In the first embodiment, the license is managed for each information processing device, however, the license may also be managed for each COD target component.

A modified example discussed hereafter is different from the first embodiment in terms of a process of managing the license of each of the COD target components, but other hardware configurations etc. are the same. Therefore, the repetitive explanations are omitted by marking the same elements with the same numerals and symbols.

Figures 10, 11:
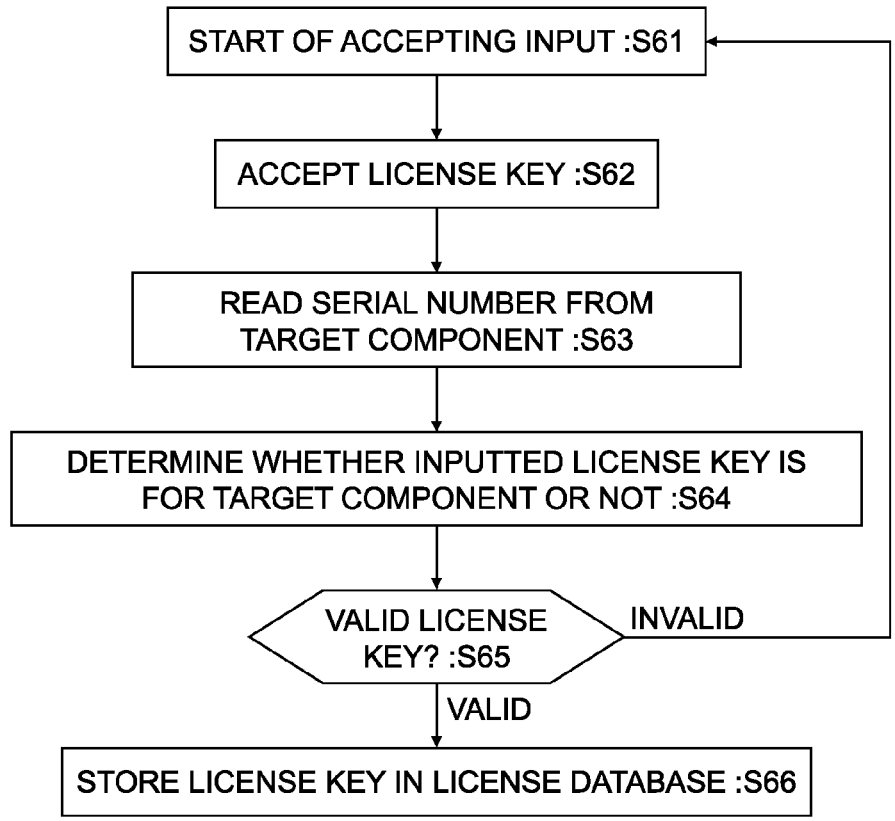
FIG. 10 is an explanatory flowchart of a process of adding the license key to the information processing device in a modified example.
FIG. 11 is an explanatory diagram of a license database in the modified example.

FIG. 10 is an explanatory flowchart of a process of adding the license key to the information processing device.

When the user purchasing the license key makes the license adding instruction by operating the console connected to the management device, the management device executes the input/output program (S61), and the CPU 51 starts function as the license registering unit. At first, the CPU, that is the license registering unit, prompts the user to input the license key by displaying the message.

When receiving the license key via the console through the user's operation (S62), the license registering unit reads the serial number of the CPU 20 from the FRU ID ROM 21 of the CPU 20 (S63). If a plurality of COD target components exists in the information processing device, the COD target component can be selected by reading the serial numbers of all of the target components having none of the licenses. On the other hand, the COD target component can be selected by information inputted by the user for specifying the COD target component together with the license key and reads the serial number of the COD target component associated with this information in s62.

Then, the license registering unit checks whether the inputted license key is valid or not, i.e., whether the inputted license key is relevant to the readout serial number or not (S64).

For example, the license registering unit processes the serial number and the license key with the function such as the hash function, and checks whether the predetermined result is acquired or not. Namely, the license key is generated so that the predetermined result is acquired when executing the process in combination with the serial number of the COD target component.

As a result, the license registering unit loops back to S61 for requesting an input of the license key (S65) if the inputted license key is invalid. If the inputted license key is valid, the license registering unit stores the license information of the COD target component in the license database (S65 and S66).

FIG. 11 is an explanatory diagram of the license database. In this modified example, the serial number and the license key of each COD target component are stored in the way of being associated with each other. Incidentally, the license key may be omitted from the license database. FIG. 11 illustrates that the COD target component of which the serial number is stored in the license database is usable, while the COD target component of which the serial number is not stored therein is unusable. Namely, in this modified example, a count of the serial numbers stored in the license database corresponds to the CPU count of the CPUs usable in the information processing device 10.

In the present modified example, the processes executed according to the configuration determining program are substantially the same as those in FIG. 7 given above. When the COD data management program requests the COD information to be read in s24, however, the COD data management program reads the serial number of the CPU 20 together with the status information as the COD information in s42 (FIG. 8).

Further, the configuration determining program notifies the license management program of the serial number of the COD target component together with a signal representing this query on the occasion of querying the license management program about whether there is the license or not in s26.

Figure 12:
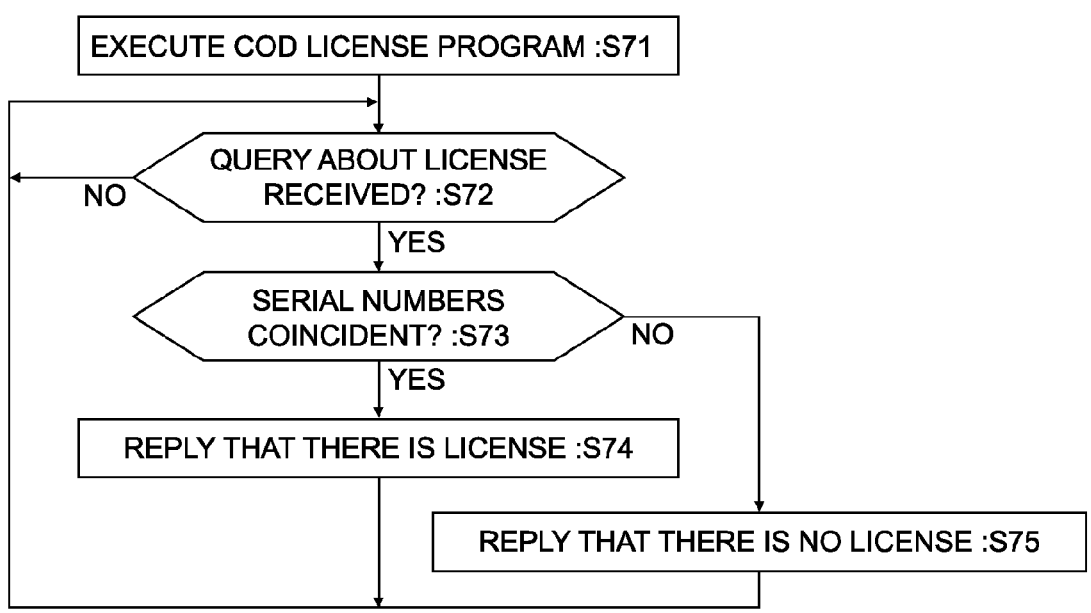
FIG. 12 is an explanatory flowchart of a process executed according to the license management program in the modified example.

Herein, FIG. 12 illustrates processes executed according to the license management program when receiving the query about the license information from the configuration determining program (FIG. 7).

To start with, the management device 15 executes the COD data management program (S71) and stands by till the query about the license is given from the configuration determining program (S72). Upon receiving this query (S72, Yes), the license management unit checks whether or not the serial number received when the query is made coincident with the serial number stored in the license database (S73).

Herein, if the serial numbers are coincident with each other (S73; Yes), the license management unit makes a response indicating that there is the license (S74). If the serial numbers are not coincident, the license management unit makes a response indicating that there is no license (S75), and loops back to s72.

According to this modified example, even in a case that the COD target CPU 20 is demounted fraudulently from the system board and mounted in another system board, the configuration determining program determines that this CPU 20 is the COD target component with the result that the demounted CPU can not be used so far as the license is purchased, and hence the fraudulent use can be thus prevented.

Moreover, in the modified example, the license is managed on the per-COD-target-component basis. In the case of the CPU with its license key being purchased, this CPU can be formally transferred into another information processing device and then used by re-registering the license key in another information processing device, whereby it is feasible to provide the flexibility to change in configuration.

Second Embodiment

What differentiates a second embodiment to be discussed hereafter from the first embodiment taking the configuration that the management device has the license determining information representing the existence or non-existence of the license, is a configuration that the COD target component has the license determining information. Note that other configurations are substantially the same, and the repetitive explanations are omitted by marking the same elements with the same numerals and symbols.

Figure 13:
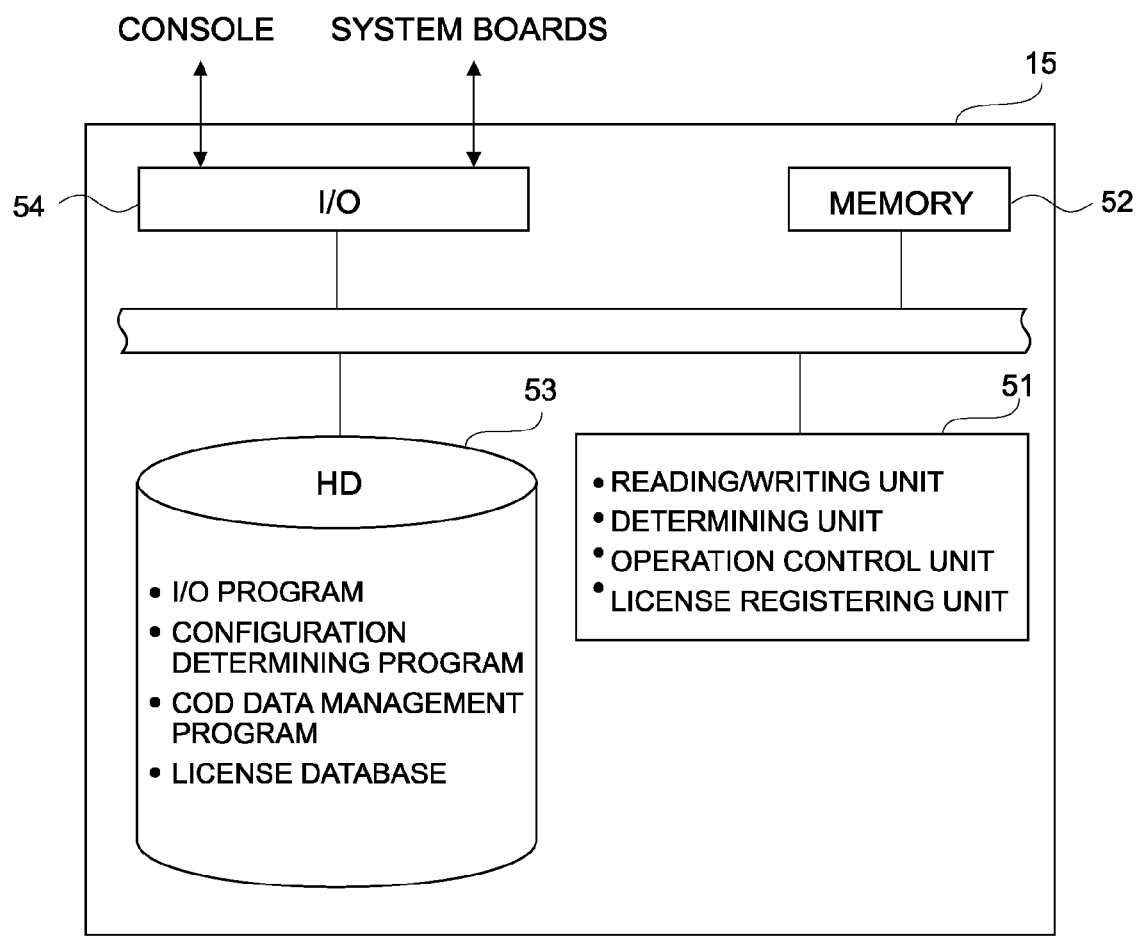
FIG. 13 is a schematic diagram of a configuration of the management device according to a second embodiment.

FIG. 13 is a schematic diagram of a configuration of the management device according to the second embodiment. The management device 15 in the second embodiment illustrated in FIG. 13 reads the license determining information from the CPU 20, and therefore the license management unit (license management program) is omitted as compared with the first embodiment (FIG. 3) discussed above. It should be noted that the CPU 51 operates as a reading/writing unit which writes the COD information as well as functioning as the reading unit which reads the COD information, according to the COD data management program.

Figure 14:
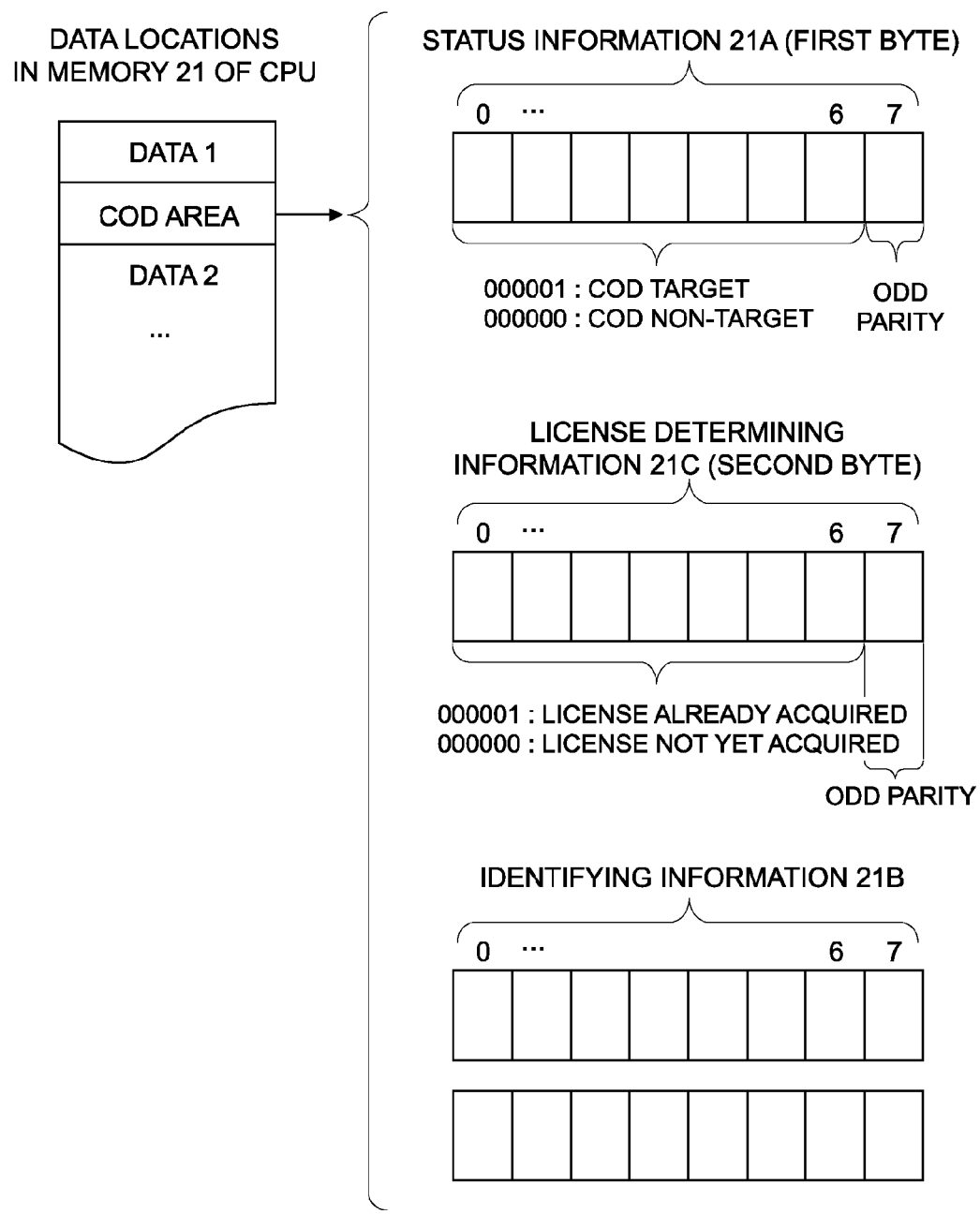
FIG. 14 is a diagram illustrating an example of the data locations in the memory provided in the component in the second embodiment.

FIG. 14 is a diagram illustrating an example of data locations in the memory 21 provided in the CPU 20 in the second embodiment.

The memory 21 has the COD area in the specific addresses, and the COD area is stored with COD information. The first byte of this COD information is the status information 21A representing whether the CPU 20 is a COD target component or not. In the 1-byte status information, a 7-bit code represents whether the CPU 20 is the COD target component or not, and the last 1 bit is a parity code for detecting the garbled data.

The second byte of the COD information is license determining information 21C representing whether the license has already been acquired or not. In the 1-byte status information, a 7-bit code represents whether the license has already been acquired or not, and the last 1 bit is a parity code for detecting the garbled data.

Further, the COD information in the memory 21 contains a unique piece of identifying information (a serial number in the second embodiment) 21B on the per-CPU-basis from the third byte onward.

Each of the processes of the management method executed by the management device 15 having the configuration described above according to the firmware will be described with reference to FIGS. 15 and 16.

Figure 15:
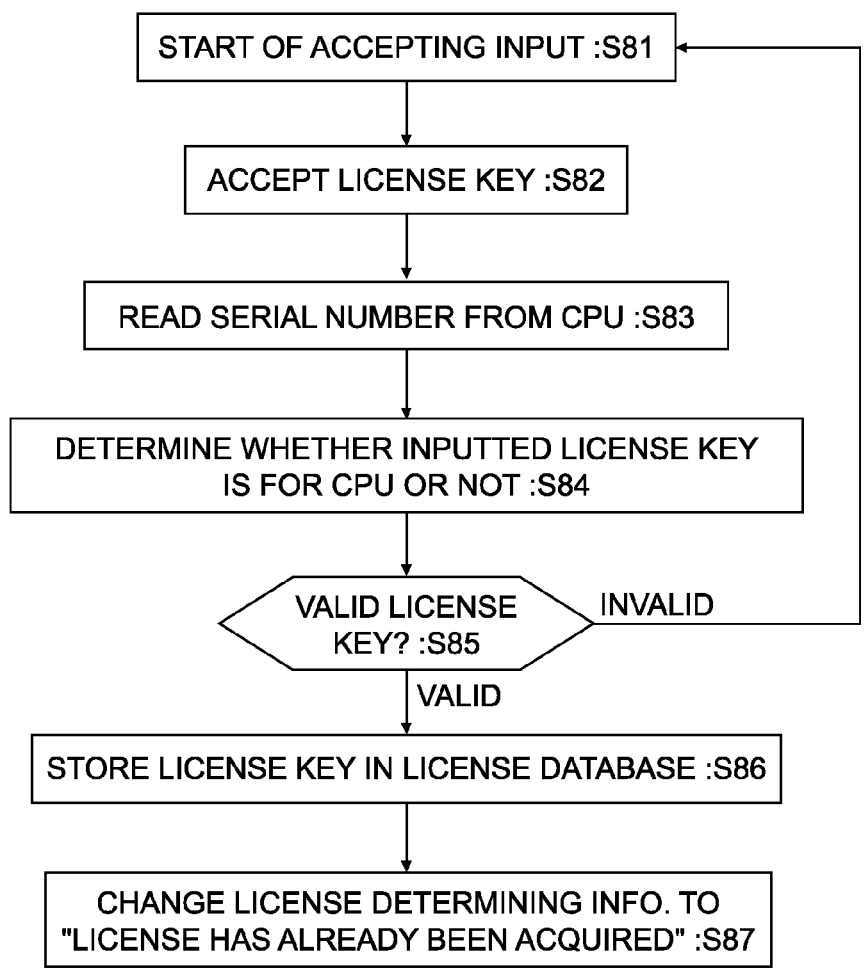
FIG. 15 is an explanatory flowchart illustrating a process of adding the license key to the information processing device in the second embodiment.

FIG. 15 is an explanatory flowchart illustrating a process of adding the license key to the information processing device.

When the user who purchased the license key makes the license adding instruction by operating the console connected to the management device, the management device executes the input/output program (S81), and the CPU 51 functions as the license registering unit and at first prompts the user to input the license key by displaying a message.

When receiving the license key via the console through the user's operation (S82), the license registering unit reads the serial number from the memory (FRU ID ROM 21) of the CPU 20 defined as the COD target component (S83). If a plurality of COD target components exists, the license registering unit may read the serial numbers of all of the COD target components having none of the licenses. On the other hand, the user may input the information for specifying the COD target component together with the license key, and the license registering unit reads the serial number of the COD target component associated with this information in s82.

Then, the license registering unit checks whether the inputted license key is valid or not, i.e., whether the inputted license key is relevant to the readout serial number or not (S84).

For example, the license registering unit processes the serial number and the license key with the function such as the hash function, and checks whether the predetermined result is acquired or not. Namely, the license key is generated so that the predetermined result is acquired when executing the process in combination with the serial number of the COD target component.

As a result, the license registering unit loops back to step 81 for requesting an input of the license key (S85) if the inputted license key is invalid, and, whereas if the inputted license key is valid, stores the license information of the target component in the license database (S85 and S86).

Further, if the inputted license key is valid, the license registering unit requests the COD data management program (the reading/writing unit) to write the license determining information (S87). In response to this request, the reading/writing unit changes the license determining information of the CPU 20 to information indicating that the license has already been acquired.

Figure 16:
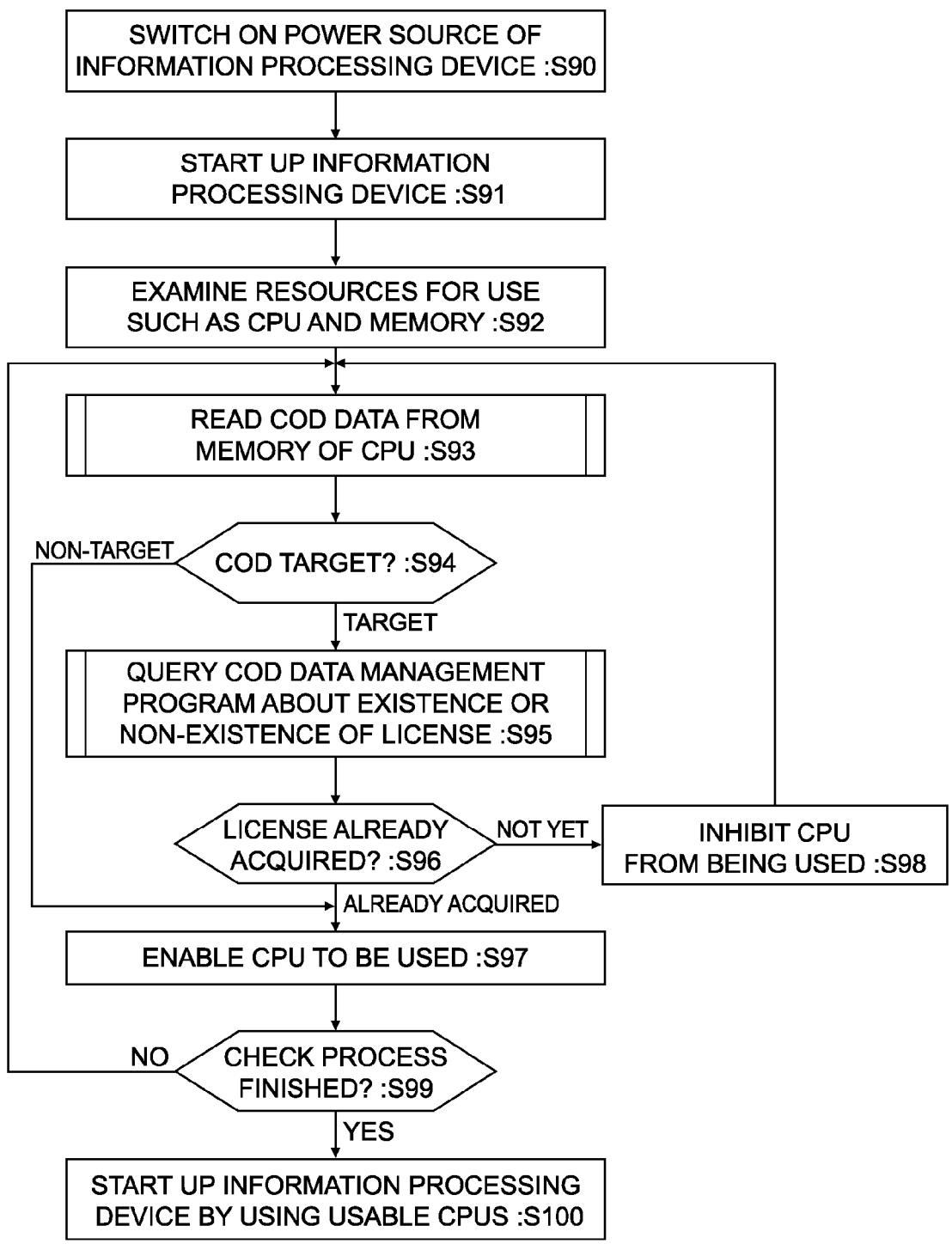
FIG. 16 is an explanatory flowchart of a process executed according to the configuration determining program in the second embodiment.

FIG. 16 is an explanatory flowchart of processes executed according to the configuration determining program when starting up the information processing device.

When the user performs the operation of starting up the information processing device, e.g., when the power switch of an operator panel (unillustrated) is switched ON (S90) and the startup of the information processing device takes place (S91), the management device 15 executes the configuration determining program, whereby the determining unit checks the hardware resources such as the CPU 20 and the memory 21, which are mounted in the information processing device 10 (S92).

Then, the determining unit requests the COD data management program (reading/writing unit) for at least the status information, in the COD information, about amounted component (S93). The CPU 20 will hereinafter be exemplified as the component for the convenience's sake, however, other components may be available.

Subsequently, the determining unit determines, based on a response from the reading/writing unit, whether the CPU 20 is the COD target component or not (S94).

If the CPU 20 is determined to be the COD target component, the determining unit queries the COD data management program (the reading/writing unit) about whether there is a license to use the CPU 20 or not (S95).

If the COD data management program makes a response indicating that there is a license, the configuration determining program determines that the CPU is usable. On the other hand, if the COD data management program makes a response indicating that there is no license, the configuration determining program determines that the CPU is unusable (S96).

If the CPU 20 is determined to be usable in s96 or if the CPU 20 is determined to be the COD non-target component in s94, the operation control unit conducts the control to enable the CPU 20 to be used (S97). The operation control unit gets the CPU 20 supplied with the power, allocated as the hardware resource and connected to the I/O unit and to the memories.

If the CPU 20 is determined to be unusable in s96, the operation control unit conducts the control to inhibit the CPU 20 from being used (S98). The operation control unit inhibits the CPU 20 from being supplied with the power, allocated as the hardware resource and connected to the I/O unit and to the memories.

The COD information check processes (s93-s98) with respect to each of the mounted CPUs 20 are repeated (S99). When the COD information check processes for all of the CPUs are finished, the information processing device is started up by employing the usable CPUs 20 (S100).

According to the second embodiment, even in a case that the COD target CPU 20 is demounted fraudulently from the system board and mounted in another system board, the configuration determining program determines that this CPU 20 is the COD target component with the result that the demounted CPU can not be used so far as the license is purchased, and hence the fraudulent use can be thus prevented. For example, when a COD non-target CPU 20 fails, it is possible to prevent the fraudulent use of a COD target CPU 20 not under license by replacing the failed CPU 20 with the COD target CPU 20 not under license.

Moreover, according to the second embodiment, the COD target component has the license determining information, and hence, even when transferring the COD target component into another information processing device, it is feasible check whether the license has already been acquired or not, whereby the COD target component can be formally used without re-registering the license if the license has already been acquired.

Third Embodiment

An information processing device in a third embodiment is a device provided with the COD target components with the COD information having the different format from the formats discussed in the first embodiment and the second embodiment.

The third embodiment is different from the first embodiment in terms of the configuration for storing the license determining information, and other configurations are substantially the same. Therefore, the repetitive explanations are omitted by marking the same elements with the same numerals and symbols.

FIG. 17 is a diagram illustrating an example of data locations in the memory 21 provided in the CPU 20 in the third embodiment.

The memory 21 has the COD area in the specific addresses, and the COD area is stored with COD information. The first byte of the COD information is format information 21D representing a data storage format from the second byte onward. In the 1-byte format information, a 7-bit code represents a format, and the last 1 bit is a parity code for detecting the garbled data.

If the 7-bit code representing the format is, e.g., "0000000", this indicates that the status information 21A is stored in the second byte, and the license determining information 21C is stored in the third byte, similarly to FIG. 14 in the second embodiment. Further, if the 7-bit code representing the format is, e.g., "0000001", this indicates that the status information 21A is stored in the second byte, but the third byte is not used, similarly to FIG. 4 in the first embodiment.

Moreover, the COD information in the memory 21 contains a identifying information (the serial number in the third embodiment) 21B unique to each CPU from the fourth byte onward.

Figure 18:
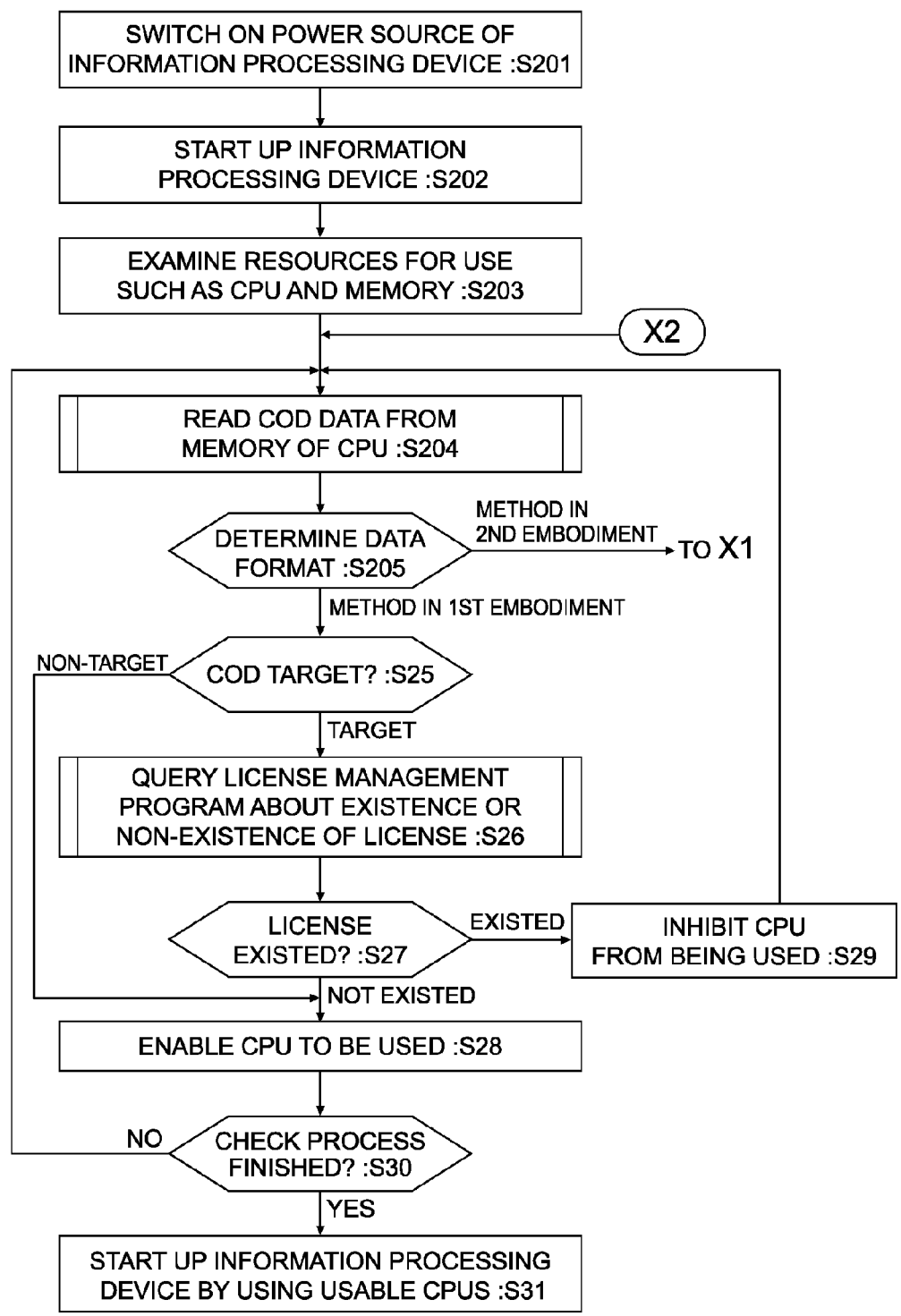
FIG. 18 is an explanatory flowchart of a process executed according to the configuration determining program in the third embodiment.
Figure 19:
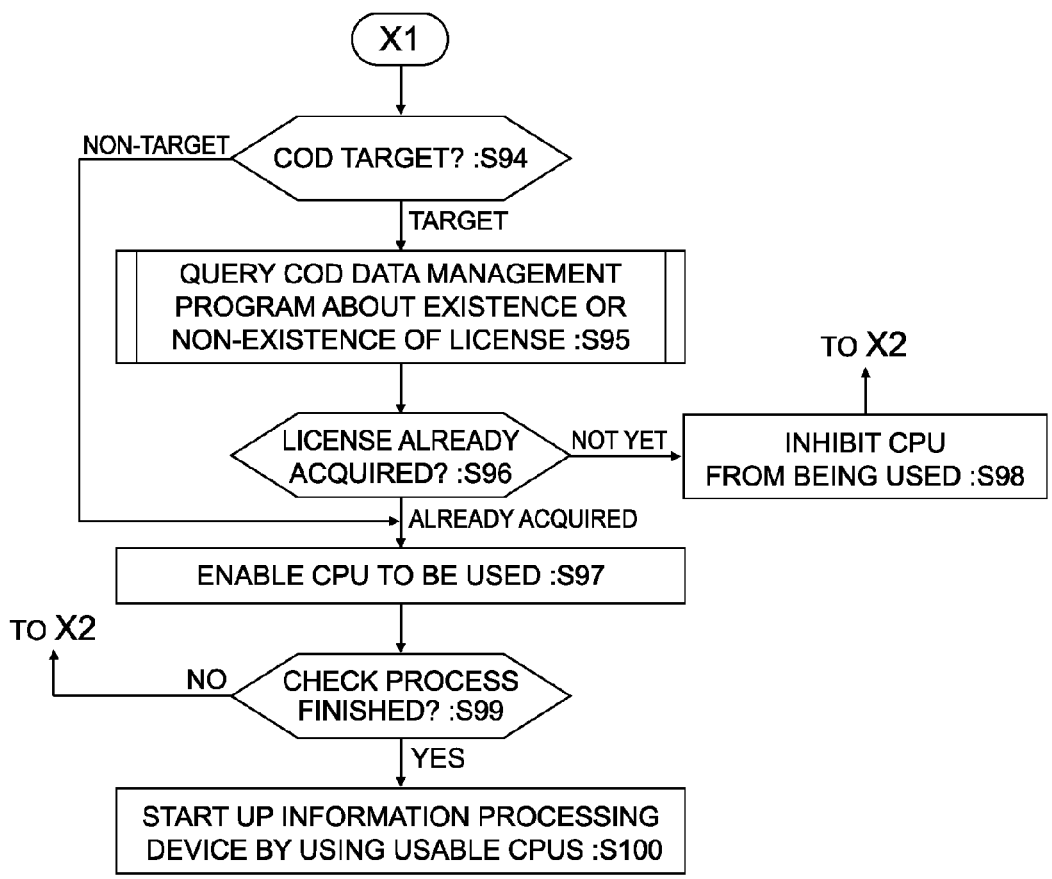
FIG. 19 is an explanatory flowchart of the process executed according to the configuration determining program in the third embodiment.

FIGS. 18 and 19 are explanatory flowcharts of processes executed according to the configuration determining program when starting up the information processing device.

When the user performs the operation of starting up the information processing device, e.g., when the power switch of the operator panel (unillustrated) is switched ON (S201) and the startup of the information processing device takes place (S202), the management device 15 executes the configuration determining program, whereby the determining unit checks the hardware resources such as the CPU 20 and the memory 21, which are mounted in the information processing device 10 (S203).

Then, the determining unit requests the COD data management program (reading/writing unit) to read the format information and the status information, in the COD information, about one mounted component (the CPU 20 will hereinafter be exemplified as the component for the convenience's sake, however, other components may be available) (S204).

Subsequently, the determining unit determines, based on the format information read by the reading/writing unit, whether the CPU 20 has the license determining information or not (S205).

Herein, the management device 15 executes the processes from s25 onward if the CPU 20 has none of the license determining information as in FIG. 7. The management device 15 executes the processes from s94 onward, if the CPU 20 has the license determining information as in FIG. 16. If it is determined that there is any CPU that is not yet processed in s30 or s99, however, the operation loops back to s—204.

According to the third embodiment, even when the COD target component having the license determining information and the COD target component having no license determining information exist in mixture, in the same way as in the first and second embodiments discussed above, the fraudulent use of the COD target component can be prevented.

<Others>

The present invention is not limited to only the illustrated examples given above but can be, as a matter of course, changed in a variety of forms within the scope that does not deviate from the gist of the present invention. Furthermore, the configuration elements can be combined to the greatest possible degree.

The embodiments given above have exemplified the CPU by way of the COD target component, however, whatever components are available on condition that those components have the memories (storage units) capable of storing the management information. The exemplification extends to, for instance, the memory, an I/O card, the system board, the power source, the storage device, etc. Moreover, respective computers configuring a computer cluster may also be available.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A management device, comprising:
   a reading unit configured to read, from each of plural components, management information identifying each of the plural components;
   a determining unit configured to refer to license information associated with the read management information of each component stored in a license storage unit, and to determine, based on the referred license information, whether each component is usable or not;
   a power source unit configured to supply electric power to each of the plural components; and
   an operation control unit configured to make a component determined to be usable operate but to inhibit an operation of a component determined to be unusable by sending control signal to the power source unit to stop supplying the electric power to the component determined to be unusable.

2. The management device according to claim 1, wherein the management information of each component contains status information representing whether management of the component is to be conducted or not, and
   the determining unit determines whether a component is usable or not when corresponding management information indicates that a management of the component is to be conducted, and does not determine whether a component is usable or not when corresponding management information indicates that a management of the component is not conducted.

3. The management device according to claim 1, wherein the management information of each component contains license determining information representing whether a license of the component has been acquired or not, and
   the determining unit determines whether each component is usable or not on the basis of the license determining information in management information obtained by the reading unit.

4. The management device according to claim 3, wherein the management information contains format information representing whether the management information contains the license determining information or not, and
   the determining unit obtains license information from a component through the reading unit when the management information of the component contains the license determining information.

5. A management method executed by a computer, the method comprising:
   reading, from each of plural components, management information identifying each of the plural components;
   referring to a license storage unit with respect to one or more pieces of license information associated with the read plural pieces of management information;
   determining, based on the one or more pieces of license information, whether each component is usable or not;
   supplying electric power to each of the plural components by a power source unit;
   making each component determined to be usable operate; and
   inhibiting the operation of each component determined to be unusable by sending control signal to the power source unit to stop supplying the electric power to the component determined to be unusable.

6. The management method according to claim 5, wherein the management information of each component contains status information representing whether management is to be conducted or not, and
   the determining, on the basis of the status information of each component, determines whether the component is usable or not about the respective components that are to be managed but does not determine whether the component is usable or not about the respective components that are not to be managed.

7. The management method according to claim 5, wherein the management information of each component contains license determining information representing whether a license has been acquired or not, and
   the determining determines whether each component is usable or not based on the license determining information of each component.

8. The management method according to claim 7, wherein the management information contains format information representing whether the license determining information is contained or not, and
   the determining determines, about the respective components having the license determining information, whether the component is usable or not on the basis of the license determining information and determines, about the respective components having no license determining information, whether the component is usable or not on the basis of information in the license storage unit.

9. A non-transitory storage medium storing a management program that causes, when read and executed by a computer, the computer to perform:
   reading, from each of plural components, management information identifying each of the plural components;
   referring to a license storage unit with respect to one or more pieces of license information associated with the read plural pieces of management information;
   determining, based on the one or more pieces of license information, whether each component is usable or not;
   supplying electric power to each of the plural components by a power source unit;
   making each component determined to be usable operate; and
   inhibiting the operation of each component determined to be unusable by sending control signal to the power source unit to stop supplying the electric power to the component determined to be unusable.

10. The non-transitory storage medium according to claim 9, wherein the management information of each component contains status information representing whether management is to be conducted or not, and
    the determining, on the basis of the status information of each component, determines whether the component is usable or not about the respective components that are to be managed but does not determine whether the component is usable or not about the respective components that are not to be managed.

11. The non-transitory storage medium according to claim 9, wherein the management information of each component contains license determining information representing whether a license has been acquired or not, and the determining determines whether each component is usable or not based on the license determining information of each component.

12. The non-transitory storage medium according to claim 11, wherein the management information contains format information representing whether the license determining information is contained or not, and the determining determines, about the respective components having the license determining information, whether the component is usable or not on the basis of the license determining information and determines, about the respective components having no license determining information, whether the component is usable or not on the basis of information in the license storage unit.

* * * * *